United States Patent [19]
Ashcraft

[11] 3,710,384
[45] Jan. 9, 1973

[54] SIGNAL-CORRELATING APPARATUS FOR IMPROVING THE ANGULAR RESOLUTION OF A DIRECTIONALLY RANGING SYSTEM

[75] Inventor: William D. Ashcraft, Fullerton, Calif.

[73] Assignee: North American Rockwell Corporation, El Segundo, Calif.

[22] Filed: Nov. 17, 1969

[21] Appl. No.: 877,311

[52] U.S. Cl. ...........................343/7 A, 343/16 R
[51] Int. Cl. .........................................G01s 9/02
[58] Field of Search ...........................343/7 A, 16 R

[56] References Cited

UNITED STATES PATENTS 3,077,595  2/1963  Frost.............................343/16 R X
3,660,842  5/1972  Ballantyne.........................343/16 R
2,709,805  5/1955  Dodington.............................343/16

*Primary Examiner*—T. H. Tubbesing
*Attorney*—L. Lee Humphries, H. Fredrick Hamann and Rolf M. Pitts

[57] ABSTRACT

Means for improving the azimuth resolution of an azimuthally scanning ground-mapping radar. The sampled-and-held video for a given range bin is processed by a correlation filter having a preselected impulse response and then differentiated. A negative-going zero level of the differentiated signal is employed as indicative of the scan time or angular position of the centroid of a sensed target to within less than the angular beamwidth of the antenna.

15 Claims, 5 Drawing Figures

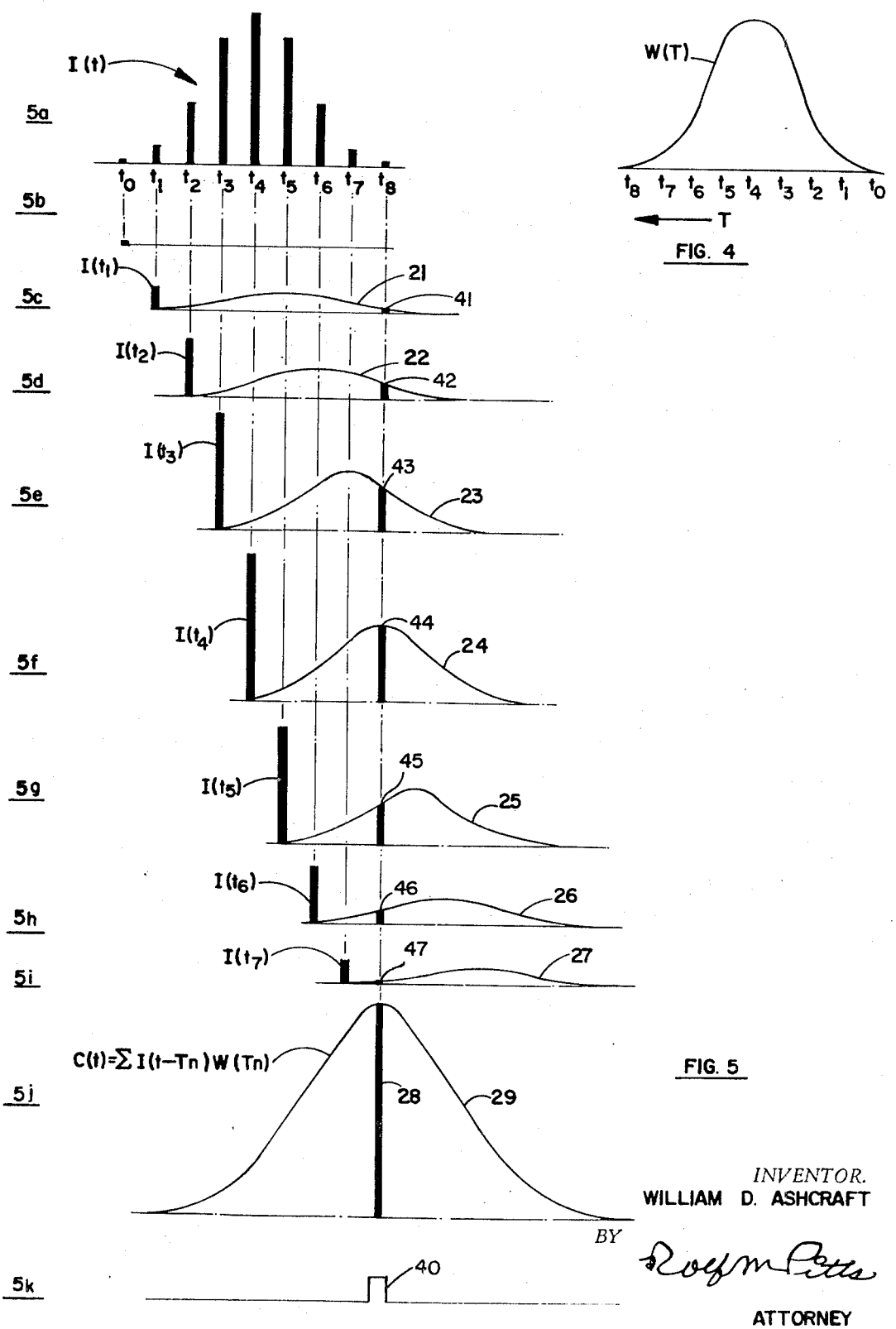

SIGNAL-CORRELATING APPARATUS FOR IMPROVING THE ANGULAR RESOLUTION OF A DIRECTIONALLY RANGING SYSTEM

CROSS REFERENCE TO CO-PENDING APPLICATIONS

1. U.S. application Ser. No. 686,113 filed Nov. 28, 1967 by C. L. Vehrs, Jr., for A Time Domain Correlator for Spatial Filtering in a Pulsed Energy System.
2. U.S. application Ser. No. 827,194 filed May 23, 1969 by D. K. Waineo for Signal Injection Means for Avoiding Monopulse Anomalies in a Monopulse Array, now U.S. Pat. No. 3,618,092.
3. U.S. application Ser. No. 639,238 filed May 17, 1967 by J. A. Moulton for Range-Gated Moving Target Signal Processor.
4. U.S. application Ser. No. 799,038 filed Feb. 13, 1969 by C. L. Lutes for Non-Linear Low Pass Filter, now U.S. Pat. No. 3,596,192.

BACKGROUND OF THE INVENTION

In the utilization of a directionally-ranging sensor such as a mapping radar or other data-sampling system for reconstructing a data matrix from the sampled elements thereof, the quality of the reconstructed image is a function of the system resolution. In an azimuthally scanning pulse-type radar in a mapping application, for example, the radial resolution may be determined by the time-bandwidth product (which varies with the transmitted pulsewidth), while the angular resolution tends to vary with the angular beamwidth of the antenna response pattern. Substantial improvement in radial or range resolution performance has been demonstrated by means of the apparatus described in copending U.S. application Ser. No. 686,113 for A Time Domain Correlator for Spatial Filtering in a Pulsed Energy System, filed Nov. 28, 1967 by C. L. Vehrs, Jr., assignor to North American Rockwell Corporation, assignee of the subject invention. However, the utility of such improved range-resolution improvement tends to be limited without corresponding improvement in the angular resolution of the system.

Prior-art approaches to angular resolution improvement over that inherent in the antenna beamwidth of the scanning antenna have included monopulse beam-sharpening and monopulse on-boresight processing techniques, as described, for example, in U.S. Pat. No. 3,283,322 issued to R. E. Hovda et al for Monopulse Receiver Apparatus and a copending U.S. application Ser. No. 827,194 for Signal Injection Means for Avoiding Monopulse Anomalies in a Monopulse Array filed May 23, 1969 by Douglas A. Waineo, assignor to North American Rockwell Corporation, assignee of the subject invention. Such monopulse resolution improvement (MRI) techniques are of limited utility in providing typically only about a 2:1 resolution improvement, and further suffer from the disadvantage that such pulse-to-pulse or single-pulse processing is subject to low signal-to-noise ratios. In other words, the received signal and noise of only a single pulse repetition interval (representing an "on-boresight" condition) is employed in generating the display signal for such repetition interval. Further, the utilization of such techniques require care in the design of the associated antenna in order to avoid monopulse anomalies due to certain sidelobe response effects as is described more fully in U.S. Pat. No. 3,355,738 issued to J. A. Algeo for Microwave Antenna Having a Controlled Phase Distribution.

Another prior-art technique for improving the angular resolution of a radar system over the beamwidth thereof, is described in U.S. Pat. No. 2,803,819 to W. R. Blair for Object Locating System and involves the method of manually or otherwise selectively scanning or oscillating an antenna over a narrow field of view of interest containing a target of interest and observing (on a display indicator) that bearing at which the target signal level is strongest or at which a maximum display level is obtained. Such technique, obviously, is unsuited for use in an automatic mapping display application for a radar system. The human judgment involved makes the result uncertain. Also, the delays involved make such a technique unacceptable where a high data rate system is required, as in an airborne mapping system.

SUMMARY OF THE INVENTION

By means of the concept of the subject invention, the above-noted disadvantages and shortcomings of the prior art are avoided and a much improved angular resolution is provided and which is useful in a high data-rate mapping application.

In a preferred embodiment of the inventive concept, a range-gated received signal sample $I(t - T)$ from a scanning sensor system is correlated with a replica or analog of the sensor angular pattern, and the scanning direction associated with a maximum correlation is determined as the direction angle of interest. There is provided a correlation filter responsive to a range-gated output of the system and having an impulse response $W(T)$ corresponding to an analog of a normalized replica of the response of the scanned sensor system to a point source target.

Gating means, responsively coupled to the filter, interconnects received signal utilization means (such as the intensity control of a PPI display indicator) to the range-gated system output only during a preselected change in sense of the amplitude rate of response of the filter.

In normal operation of the above-described arrangement, the output response of the correlation filter to the sampled input thereto is indicative of the function $I(t - T)W(T)dT$ or correlation integral, the look angle associated with the occurrence of the maximum value of the correlation integral corresponding to the true direction of the point source target. The resolution improvement so obtainable can be as high as 100:1, while the number of pulse repetition intervals or data samples over which the data for a given point source target is correlated results in a substantial improvement in signal-to-noise performance. Further, no special design requirements are imposed on the antenna sidelobe response.

Accordingly, it is an object of the invention to provide correlation means for improving the angular resolution of analog directional sensor.

It is another object of the invention to correlate the response of a directional sensor with an analog normalized sensor response to more nearly determine the directional coincidence of a point source target and the centroid of the directional response pattern of the sensor.

A further object of the invention is to provide directional sensor angular resolution improvement means providing enchanced signal-to-noise ratio performance, without imposing undue restraints upon the sensor design.

These and other objects of the invention will become more fully apparent from the following description, taken together with the accompanying drawings, in which:

BRIEF DESCRIPTION OF THE DRAWINGS

FIG. 4 is an exemplary weighting function response of the filter of FIG. 2; and

FIG. 5 is a family of time histories of the response of the correlation filter of FIG. 2, illustrating the manner of cooperation thereof in the system of FIG. 2.

DESCRIPTION OF THE PREFERRED EMBODIMENT

Figure 1:
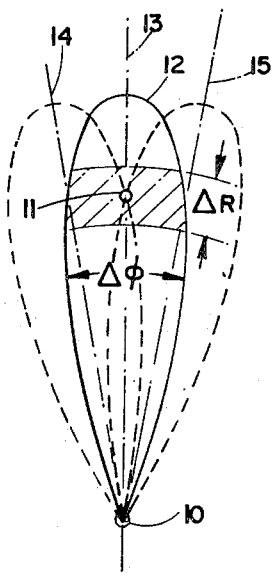
FIG. 1 is a representation of the geometry of the problem solved by means of the invention.

Referring now to FIG. 1, there is illustrated a representation of the geometry of the problem solved by means of the concept of the invention. There is illustrated a position 10 of a directional sensor such as an azimuthally scanning radar, relative to which a point source target 11 is situated, the target as viewed from position 10 being of a radial extent much less than that ($\Delta R$) represented by a transmitted pulsewidth and having an azimuthal extent much less than that ($\Delta\phi$) of the beamwidth of the sensor directive beam pattern 12. As shown in FIG. 1, target 11 is lying on the boresight or centroid axis 13 of beam pattern 12. However, a position anywhere within the beamwidth $\Delta\phi$ of pattern 12 could not, without special processing, be distinguished from that of target 11 on boresight axis 13. Similarly, where the boresight axis of the directive beam pattern is scanned from left to right in FIG. 1, a boresight axis direction 14 for which the right edge of the beam pattern illuminates target 11 and another boresight axis direction 15 for which the left edge of the beam pattern illuminates target 11 results in display indicator data erroneously indicating that the point source target has an angular extent, $\Delta\phi$, corresponding to the sensor beamwidth.

The displayed radial extent of target 11 may be substantially reduced from that ($\Delta R$) corresponding to the transmitted pulsewidth by pulse compression techniques and the like. By means of the concept of the subject invention, the displayed azimuthal extent of target 11 is substantially reduced from that ($\Delta\phi$) corresponding to the beamwidth of sensor pattern 12 by the conceptual arrangement illustrated in FIG. 2.

Figure 2:
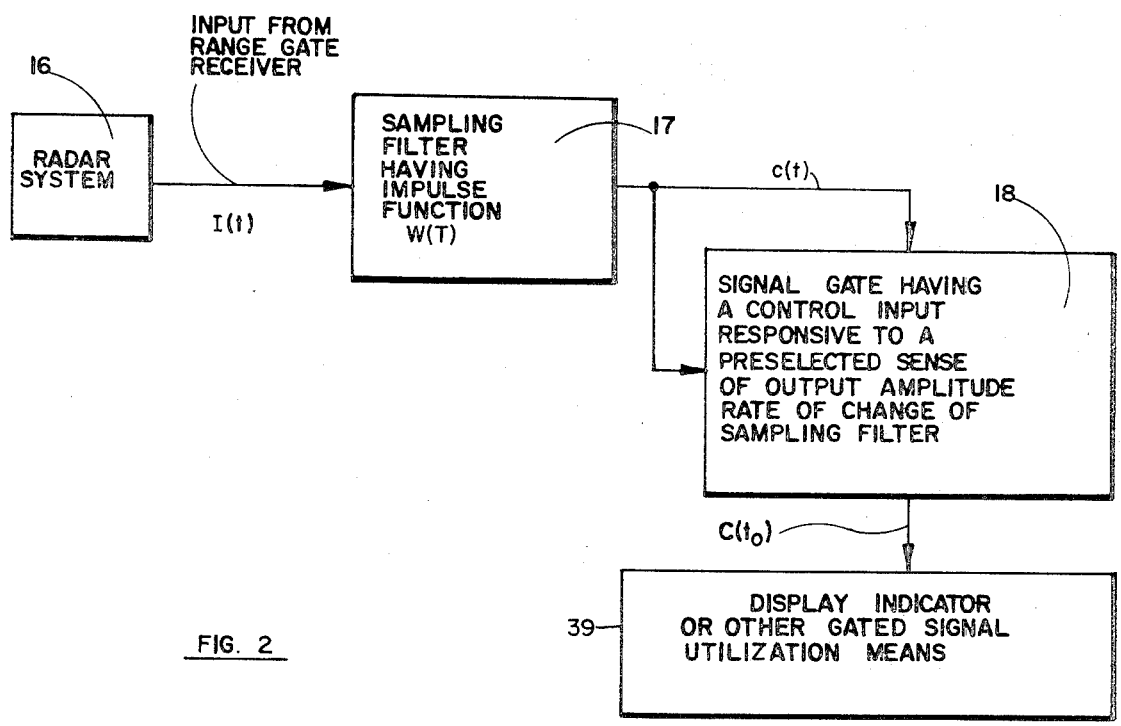
FIG. 2 is a block diagram of a system embodying the concept of the invention.

Referring now to FIG. 2, there is illustrated in block form a system embodying the concept of the invention. There is provided a directional sensor system 16 such as, for example, a pulse type ranging system or radar providing a range-gated receiver output $I(t)$. There is also provided sampling filter means 17 for sampling the output of sensor system 16 and having a preselected impulse function $W(T)$. The impulse function $W(T)$ of filter 17 is preselected as an analog of a normalized replica of the response of the scanning sensor or antenna to a point source of a preselected or normal signal strength (as measured at the antenna). For example, for the antenna azimuthal beam pattern and antenna azimuthal scan rate for a given radar system 16, a normalized replica of the system response to a scanned point source target (of normal strength) may resemble the shape of curve $W(T)$ in FIG. 4, the skirts of the curve corresponding to the weak response of the beam pattern edge in encountering the target, the peak of the curve corresponding to the centroid or boresight axis of the beam, and the time interval between the skirts corresponding to the like scan interval of illumination provided by the ratio of the antenna beamwidth to the antenna scan rate. The design of an R-C network or filter to provide a preselected response, such as the representative impulse response, is well understood in the art.

The response $C(t)$ of filter means 17 at any point in time ($t$) to an applied input $I(t)$ from the range-gated receiver of radar system 16 is the convolution integral of the filter impulse response $W(T)$ and the time history $I(t - T)$ of such applied input $$C(t) = \int_{-t}^{0} I(t-T)W(T)dT = \Sigma I(t_n - T_n)W(T_n)$$

where
 $t$ = time, the independently variable
 $(t - T)$ = a sampled point in time
 $T$ = a sample delay The time history $I(t - T)$ of the range-gated input to filter 17 may be viewed as a periodically sampled data input, the data sampling rate being the pulse repetition frequency of the pulse type radar system 16, as illustrated by FIG. 5a, the series of impulses describing the history of the amplitude envelope of the received signal. The variation in the envelope corresponds to the variation in the antenna beam pattern response as a function of target direction, relative to the boresight axis, as the beam pattern scans across the target, the function $I(t)$ progressively varying from a weak signal sample (corresponding to target illumination when the beam center is to one side 14 of the target 11 as shown in FIG. 1) to a subsequent maximum signal sample (corresponding to the beam pattern boresight axis 13 lying on the target 11 in FIG. 1) and then decreasing to a weak signal sample (corresponding to target illumination when the beam center is to the other side 15 of target 11 as shown in FIG. 1). In otherwords, the shape of the envelope of $I(t)$ for a point source target is similar to that of $W(T)$, but will vary in amplitude scaling with variations in the strength of the received signal therefrom.

The response of filter 17 to a single impulse $I(t_1)$ may be described for any point in time ($t_1 + T_n$) subsequent to the application of such impulse, as $I(t_1)W(T_n)$. Alternatively, the impulse response of filter 17 at any given point in time ($t$) may be described as a function of a prior-applied impulse $I(t - T_n)$ as $I(t - T_n)W(T_n)$. For example, the subsequent response of filter 17 to the range-gated receiver output $I(t_1)$ occurring at $t_1$, is shown as curve 21 in FIG. 5c. The response of filter 17 at a selected subsequent point in time, $t = t_1 + T_1$, to such prior applied input $I(t - T_1)$ is $I(t - T_1)W(T_1)$, shown as element 41 in FIG. 5c. The subsequent response of filter 17 to the range-gated receiver output $I(t_2)$ occurring at $t_2$, is shown as curve 22 in FIG. 5d, the responses to the remaining sampled inputs $I(t_3) - I(t_7)$ of FIG. 5a being similarly shown as curves 23–27 in FIGS. 5e–5i, respectively, the component response of filter 17 at the preselected time $t$ to each of the applied inputs $I(t_3) - I(t_n)$ being shown as elements 43–47 respectively.

The actual output response $C(t)$ of filter 17 at a preselected point in time, t, is, of course, the sum of the component responses at such point in time to each of the prior applied impulse inputs thereto:

$$C(t) = I(t-T_1)W(T_1) + I(t-T_2)W(T_2) \ldots I(t-T_i)W(T_i)$$
$$C(t) = \Sigma I(t-T_n)W(T_n)$$

Such response, shown as element 28 of the locus 29 in FIG. 5h, is also known as the convolution integral, $$C(t) = \int_{T=t}^{o} I(t-T_n)W(T_n)dT$$

$T = t$

The function $C(t)$ is seen to vary with time t, demonstrating a maximum at time $t^8$ in FIG. 5j. Such maxima is manifested by a change in sense of $C(t)$, the rate of change of $C(t)$, from a positive to a negative sense; and is observed to occur (curve 40 in FIG. 5k) slightly later later ($\Delta t_d$) than the occurrence of a maximum value of $I(t_4)$, as to be indicative of the past direction coincidence of the beam centroid 13 and target 11 in FIG. 1. In other words, the occurrence of a maximum value of the convolution integral represents the optimum correlation of the system response replica and the actual response to a point source target, corresponding to a delayed indication of that scan time ($t_4$) associated with the direction angle ( ($t_4$)) of such point source target.

Signal gating means 18, responsive to such preselected change in sense of the rate of change of the output $C(t)$ of filter 17 (in FIG. 2), may then be employed to gatingly couple the input of signal utilization means 39 to the range-gated system only during a scan time interval corresponding to the brief occurrence of the maxima, $C_{max}$, as to provide a display of improved angular resolution. In other words, the cooperation of the correlating filter 17 in FIG. 2 collapses a point target display in azimuth to a small fraction of the antenna beamwidth, so that the target appears as a point on the display. The true shape of a displayed target complex is thus more clearly perceived, general intepretation of a ground map image is enhanced and the true azimuth position of a target of interest may be more accurately determined.

As shown in the arrangement of FIG. 2, signal utilization means 39 is coupled via gating means 18 to the range-gated, time averaged or integrated output of filter 17. The advantage of such arrangement is that such display signal, derived from received signals over a plurality of pulse repetition intervals, is less noisy, the noise tending to "average out" over the integration interval, whereby an improved signal-to-noise ratio is obtained. Also, hard targets tend to stand out more clearly on the display as to be more readily identifiable at longer ranges. The constant delay $\Delta t_d$ merely results in a small angular bias in the rotation of the ground map display provided by utilization means 39.

Figure 3:
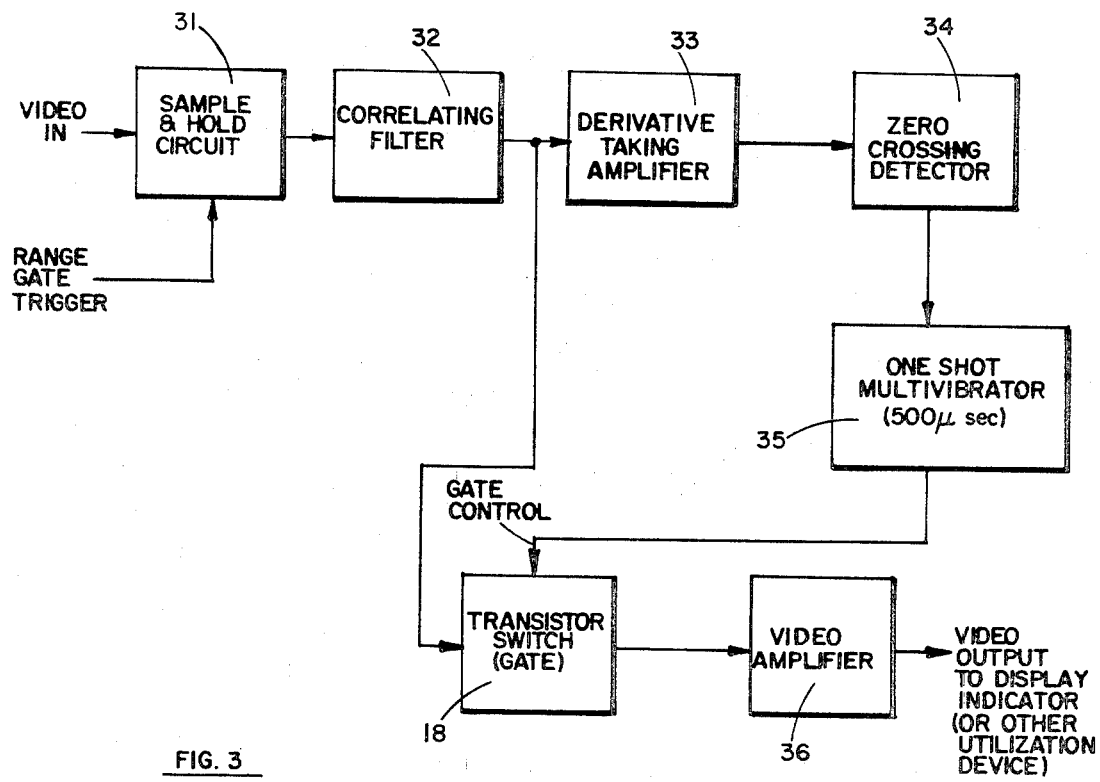
FIG. 3 is a block diagram of an exemplary embodiment of the system of FIG. 2.

An exemplary mechanization of the correlator arrangement of FIG. 2 is shown in fuller detail in FIG. 3. There is provided correlating filter means comprising range-gated sample-and-hold means 31 adapted to be responsive to a receiver output of radar system 16 (of FIG. 2) and a filter circuit 32 responsive to sample-and-hold means 31 and having a preselected impulse function corresponding to that described in connection with FIG. 4. The construction and arrangement of a range-gated sample and-hold means 31 is well understood in the art, as indicated by copending U. S. application Ser. Nos. 639,238 filed May 17, 1967 for Range-Gated Moving Target Signal Processor by J. A. Moulton and 799,038 filed Feb. 13, 1969 for Non-Linear Low Pass Filter by C. L. Lutes, both of which applications are assigned to North American Rockwell Corporation, assignee of the subject application; therefore, such element is shown in block form only. Filter 32 may be fashioned from a suitable RC network.

There is also provided in FIG. 3 rate signalling means 33 responsive to an output of filter circuit 32 for providing a signal indicative of the amplitude rate of change of the output of filter circuit 32. Such rate signalling means may be comprised of a differentiating amplifier providing impedance isolation as well as amplitude-rate signalling. There is further provided gate control means, coupled to an output of rate-signalling means 33 and responsive to a preselected change of sense of the rate of change signal, for generating a gate control signal. Such gate control means comprises a zero-crossing detector 34 for detection of a rate signal change in sense indicative of the occurrence of a correlation maxima (i.e., peak of curve 29 in FIG. 5i). An output of detector 34, indicative of such state, is fed to a one-shot multivibrator 35 for generation of a gate-control signal (Curve 40 in FIG. 5k). Signal gate means 18, such as a switching transistor, having a control input responsive to the gate control signal, couples the integrated output of filter 32 to a video amplifier 36 for providing both impedance isolation and amplification of the gated filter output, if desired.

Although the rate-signalling and gate-control means of FIG. 3 have been described in terms of conventional analog signalling components, it is clear that the concept of the invention is not so limited and that equivalent digital signalling means may be alternatively employed. Also, although the utilization of the inventive concept has been described in terms of improved angular resolution for a mapping radar, it is clear that the disclosed technique for angular resolution improvement may be applied to other types of ranging systems and scanning sensor systems. Further, the applicability of the concept is not limited to only a single range-bin of a range gated system, but is to be understood as equally applicable to all range-bins of interest in a range-gated directionally ranging system. Moreover, the correlation concept is not limited to range-gated systems, but is useful in a directionally scanning, passive directional sensor to more accurately determine the direction of an active point source target such as a beacon.

In other words, the correlation concept of the invention, is useful in any data pattern sampling system for improving the indicated directional resolution thereof by correlating the actual system response with a normalized replica of the system response to a scanned point source data element, by means of a filter having an impulse response representing an analog of such replica.

Although the invention has been described and illustrated in detail, it is clearly understood that the same is by way of illustration only and is not to be taken by way of limitation the spirit and scope of this invention being limited only by the terms of the appended claims.

I claim:

1. A method for improving the indicated directional resolution of a range-gated directionally scanned directionally ranging system having received signal utilization means and comprising the steps of subjecting a range-time gated sample-and-held electrical output of said system, indicative of a preselected target range, to a filter circuit having a preselected impulse function corresponding to an analog of a normalized replica of the response of said system to a scanned point source target; and responsively coupling said signal utilization means to the output of said filter circuit only during an interval of a rate of change of said output of said filter indicative of a maxima thereof.

2. In a data pattern sampling system having output signal utilization means, correlation means for improving the indicated directional resolution of said system and comprising signal shaping means responsive to a range-gated output of said system and having an impulse response corresponding to an analog of a normalized replica of the response of said sampling system to a point source data element; and gating means responsively coupled to said signal shaping means for coupling an input of said signal utilization means to said system only during a preselected change in sense of the amplitude rate of response of said signal shaping means corresponding to a maximum correlation of said system response with said data element.

3. Means for improving the angular resolution of a directionally scannable directional sensor having a given beamwidth, comprising correlating electrical filter means adapted to be responsively coupled to an electrical output of said sensor and having an impulse response function corresponding to an analog of a normalized replica of the scanned sensor response to a point source target; and means responsively coupled to said correlating filter for gating-on an output thereof only during a preselected change in sense of the amplitude rate of response of said filter.

4. The device of claim 3 in which said filter means comprises range-time-gated sample-and-hold means adapted to be responsive to an electrical output of said sensor which is indicative of a preselected target range; and a filter circuit responsive to said sample-and-hold means and having a preselected impulse function.

5. The device of claim 3 in which said means for gating-on comprises rate-signalling means responsive to an output of said filter means for providing a signal indicative of the rate of change of said output of said filter means;

gate control means coupled to an output of said rate-signalling means and responsive to a preselected change of sense of said rate of change signal for generating a gate control signal; and signal gate means coupled to said output of said filter and having a gate control input responsive to said gate control signal.

6. In a range-gated directionally scanned directionally ranging system having received signal utilization means, means for improving the indicated directional resolution of said system and comprising a correlation filter responsive to a range-gated output of said system and having an impulse response corresponding to an analog of a normalized replica of the response of said scanned system to a point source target; and gating means responsively coupled to said correlation filter for coupling said signal utilization means to said range-gated system output only during a preselected change in sense of the amplitude rate of response of said filter.

7. The device of claim 6 in which said signal utilization means is responsively coupled to said system by said correlation filter and said gating means in tandem.

8. The device of claim 6 in which said gating means comprises a signal gate gatingly interconnecting an input of said signal utilization means and an output of said filter and having a gate control input responsive to a preselected change in sense in the amplitude rate of change of the output of said filter.

9. The device of claim 6 in which said gating means comprises control signal means responsive to an output of said filter for providing a control signal only during a preselected change in sense of the amplitude rate of response of said output of said filter; and a signal gate interconnecting an output of said signal utilization means and said output of said filter and having a gate control input responsive to said control signal.

10. The device of claim 6 in which said filter means comprises range-time gated sample-and-hold means adapted to be responsive to an electrical output of said sensor indicative of a preselected target range;

a filter circuit responsive to said sample-and-hold means and having a preselected impulse function.

11. The device of claim 6 in which said means for gating-on comprises rate-signalling means responsive to an output of said filter means for providing a signal indicative of the rate of change of said output of said filter means gate control means responsive to an output of said rate-signalling means responsive to a preselected change of sense of said rate of change signal for generating a gate control signal;

signal gate means coupled to said output of said filter and having a gate control input responsive to said gate control signal.

12. In a directionally scanned directionally ranging system having output signal utilization means, correlation means for improving the indicated directional resolution of said system and comprising range-gated signal shaping means responsive to an output of said system and having an impulse response corresponding to analog of a normalized replica of the response of said ranging system to a point source target; and gating means responsively coupled to said signal shaping means for coupling said signal utilization means to said system only during a preselected change in sense of the amplitude rate of response of said signal means corresponding to a maximum correlation of said system response with said point source target.

13. A correlation technique for improving the indicated directional resolution of a data pattern sampling system having output utilization means and comprising the steps of subjecting a range-gated output of said system to signal shaping means having an impulse responsive corresponding to an analog of a normalized replica of the response of said sampling system to a scanned point source data element; and responsively coupling said signal utilization means to said system only during a preselected change in sense of the amplitude rate of the response of said signal shaping means corresponding to a maximum correlation of said system response with said data element.

14. A correlation technique for improving the indicated directional resolution a data pattern sampling system having output utilization means of and comprising the steps of subjecting a range-gated output of said system to signal shaping means having an impulse response corresponding to an analog of a normalized replica of the response of said sampling system to a directionally scanned point source data element; and responsively coupling said signal utilization means to said signal shaping means only during a preselected change in sense of the amplitude rate of the response of said signal shaping means corresponding to a maximum correlation of said system response with said data element.

15. In a range-gated directionally scanned directionally ranging system having received signal utilization means, means for improving the indicated directional resolution of said system and comprising range-time gated sample-and-hold means adapted to be responsive to an electrical output of said system indicative of a preselected target range;

a filter circuit responsive to said sample-and-hold means and having a preselected impulse function;

rate-signalling means responsive to an output of said filter means for providing a signal indicative of the rate of change of said output of said filter means;

gate control means coupled to an output of said rate-signalling means and responsive to a preselected change of sense of said rate of change signal for generating a gate control signal; and signal gate means coupled to said output of said filter and having a gate control input responsive to said gate control signal.

* * * * *